United States Patent [19]

Shiver

[11] Patent Number: 4,482,459
[45] Date of Patent: Nov. 13, 1984

[54] CONTINUOUS PROCESS FOR THE RECLAMATION OF WASTE DRILLING FLUIDS

[75] Inventor: Carolyn Shiver, Church Point, La.

[73] Assignee: Newpark Waste Treatment Systems Inc., Metairie, La.

[21] Appl. No.: 489,127

[22] Filed: Apr. 27, 1983

[51] Int. Cl.$^3$ .................... C02F 1/44; C02F 1/56
[52] U.S. Cl. .................... 210/639; 210/652; 210/665; 210/666; 210/667; 210/694; 210/725; 210/727; 210/728; 210/776; 210/781
[58] Field of Search ............... 210/195.1, 195.3, 195.4, 210/713, 714, 724, 725, 202, 406, 779, 806, 694, 259, 294, 320, 170, 747, 704, 705, 637, 652, 665–667, 727, 728, 776, 781; 175/66, 206; 405/128, 129

[56] References Cited

U.S. PATENT DOCUMENTS

| | | | |
|---|---|---|---|
| 2,156,333 | 5/1939 | Cross et al. | 210/62 |
| 3,350,301 | 10/1967 | Hoffman | 210/44 |
| 3,479,281 | 11/1969 | Kikindia et al. | 210/703 |
| 3,575,853 | 4/1971 | Gaughan et al. | 210/205 |
| 3,577,341 | 5/1971 | Keith, Jr. et al. | 210/44 |
| 3,664,440 | 5/1972 | Elenburg | 175/206 |
| 3,737,037 | 6/1973 | Bone | 175/66 |
| 3,777,405 | 12/1973 | Crawford | 34/57 R |
| 3,794,167 | 2/1974 | Olgard et al. | 210/802 |
| 3,901,804 | 8/1975 | Ohuchi et al. | 210/50 |
| 4,001,114 | 1/1977 | Joseph et al. | 210/705 |
| 4,013,555 | 3/1977 | Davis | 210/725 |
| 4,161,445 | 7/1979 | Coillet | 110/23 H |
| 4,200,526 | 4/1980 | Johnson et al. | 210/23 |
| 4,234,421 | 11/1980 | Dover | 210/728 |
| 4,288,328 | 9/1981 | Montgomery | 210/724 |
| 4,320,012 | 3/1982 | Palm | 210/713 |
| 4,350,596 | 9/1982 | Kennedy, Jr. | 210/708 |
| 4,353,803 | 10/1982 | Dover, Jr. | 210/728 |
| 4,366,063 | 12/1982 | O'Connor | 175/66 |

OTHER PUBLICATIONS

Chemical Engineers' Handbook, Perry and Chilton, Fifth Edition, pp. 19–76.

*Primary Examiner*—Barry S. Richman
*Assistant Examiner*—John Donofrio

[57] ABSTRACT

A continuous process for the reclamation of a slurry of waste drilling mud fluids and water normally resulting from drilling operations. The process comprises the steps of conducting the drilling mud slurry to a slurry surge tank for liquid solid separation by chemical and physical methods.

The mud slurry is subjected to a primary solids separation unit after pH adjustment is used to initiate coagulation and an organic flocculant is added to aid flocculation of the solids.

The water is then subjected to a secondary solids removal, and the solids recovered are reintroduced in the primary solids separation unit. Thereafter the water obtained from the secondary solids removal is then subjected to a chemical oxygen demand reduction unit having a carbon adsorption unit or reverse osmosis membrane units therein to remove organic matter or dissolved solids to produce water meeting environmental discharge requirements. The solids removed from the primary solids separation unit are converted to a cake meeting leachate requirements for other beneficial use.

10 Claims, 6 Drawing Figures

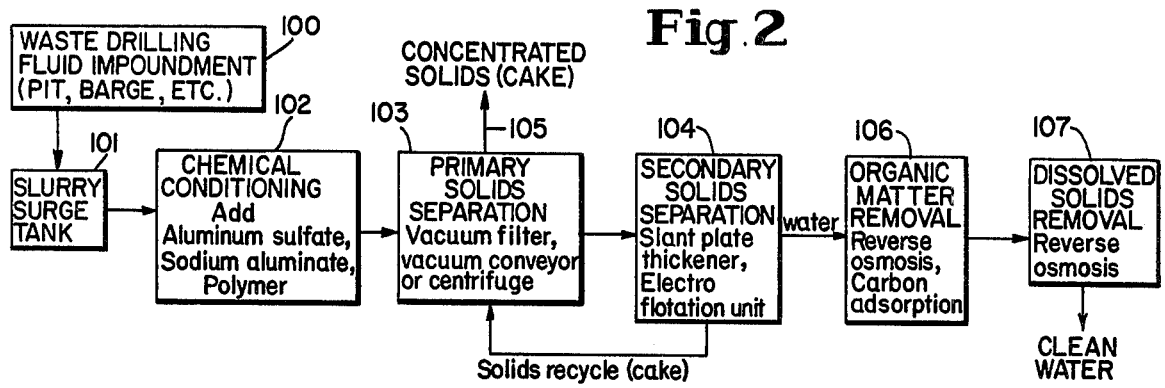
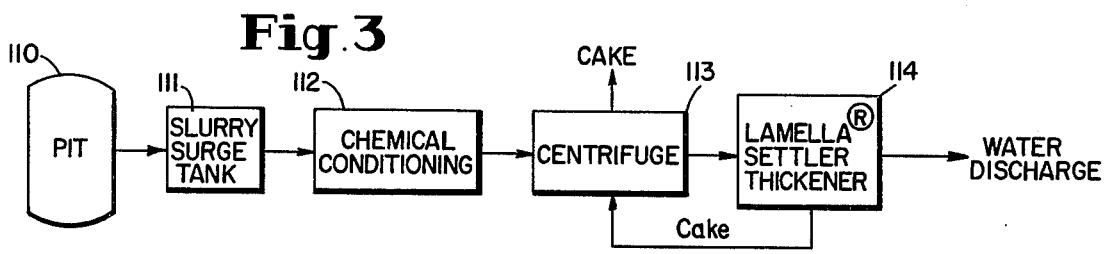
Fig. 4
Fig. 5

CONTINUOUS PROCESS FOR THE RECLAMATION OF WASTE DRILLING FLUIDS

TECHNICAL FIELD

I have developed a mobile, continuous process for the reclamation of waste drilling fluids normally contained in reserve pits at drilling sites or barges or other containers from over water drilling sites. The reclamation of these waste fluids has gained increased attention recently due to possible adverse environmental effects such wastes have on soil stability, ground and surface water, land use and visual aesthetics. Depending upon the character of the waste drilling fluids treated and the availability of raw water at the drilling site, my process can yield barite, solids (generally clay and silt), oil, brine and clean water as by-products. The process generally makes new uses of new or existing apparatus in a new and mobile application. The continuous process converts the liquid waste containing both liquid and solid waste drilling fluids into clean environmentally dischargeable water employed originally as a carrier or conveyor of drilled solids in the drilling fluids; and a relatively dry non-leaching mud cake originating as drilled solids, viscosifiers, or weighting agents in the drilling fluids which can be conventionally landfilled on or off location after treatment.

BACKGROUND ART

Heretofore reserve pits of waste drilling fluids have been chemically treated and have had to lie dormant for several days or weeks while the solids under gravity clarification settle so that the liquid can be pumped off the top. Then the heavier solids are left in the pit for subsequent cleanup by other means. Such processes are shown in the two Virgil L. Dover U.S. Pat. Nos. 4,234,421 and 4,353,803.

A method and apparatus for supplying and controlling the flow of a liquid suspension through a laminar apparatus having separate parallel sedimentation spaces formed by plates inclined relative to the horizontal plane is shown in U.S. Pat. No. 3,794,167 of the type marketed by way of example under the trademark LAMELLA ®.

My process employs a liquid-solid separator which floats coagulated and flocculated particles by introducing air into a container below which light solids solutions flow so that the particulate matter rises to the surface on a blanket of air from which it is skimmed. The air may be introduced from a low pressure pump or by other means.

I use each of the above apparatuses in my mobile process making a new use of the old apparatus in a new process not taught nor suggested in the above patents as an anticipation of my claims to my new continuous mobile process. The equipment for practicing my process is mounted in mobile trailers which may be moved from site to site over the highway by tractors.

My process reduces both processing time and processing space required and is mobile and can be moved onto site and set up in a few hours. I treat the waste drilling fluids and then I relocate the mobile unit leaving the processed site ready for reuse and/or reclamation compatible with the environment.

My prior art search disclosed the following U.S. Pat. Nos.:

Cross et al (2,156,333) discloses a broad and general overview of cleaning oil well drilling fluids. Shown is refuse pit M, settling tank J, filter K, centrifuge L for generally liquid-solids separation. No chemical treatment as claimed herein appears to be disclosed, however.

Ohuchi et al (3,901,804) discloses a method for processing sludge showing a flocculator 2, a pH adjustment tank 12, and a solid separation tank 7 for the purpose of metal separation.

Johnson et al (4,200,526) discloses a waste water treatment process with pH adjustment, flocculating, filtering and reverse osmosis.

Crawford (3,777,405) discloses a drilling mud reclaiming apparatus which is portable and otherwise of general interest only.

Coillet (4,161,445) generally discloses brine/water separation by reverse osmosis process. The following U.S. Pat. Nos. are of general background interest:
3,350,301
3,577,341
3,664,440
4,001,114
4,350,596.

DISCLOSURE OF THE INVENTION

My continuous process of liquid waste pit treatment is achieved with proprietary chemistry using neutralization, solids precipitation, coagulation and flocculation.

During the first phase of my process, the neutralization is necessary to remove organics, heavy metals and other contaminants. The pH is reduced to precipitate organics, while the reactive solids are neutralized electrochemically and begin to settle.

The clarified water still contains many heavy metals and other contaminates, which do not precipitate at a lower pH. During the second phase the pH is raised to neutral, causing precipitation of these metals and other contaminates.

During the neutralization process, many of the negatively charged particles coagulate with the positively charged ions being added to the waste water stream. This produces tiny layers of heavy platelets and thereby promotes settling.

In order to allow increased flow rates during treatment, the faster process of flocculation is employed as a final step. The addition of an organic polymer to the waste stream creates the flocculation necessary to achieve consistently high production rates. A highly reactive long chained polymer is fed into the waste stream and attracts the coagulated solids to form larger particles which quickly separate from the water.

The pH of the waste is adjusted by chemical injection and mixing with the influent from the drilling fluid source. This pH adjusted slurry, typically containing 35 weight percent solids or less, flows directly into a centrifuge where polymer is added.

The centrate from the centrifuge contains fairly light solids, normally 3 to 5 weight percent. The centrate may even be clear water, depending upon the type of solids in the feed and the amount of polymer being added to the centrifuge. Heavy drill solids and barites centrifuge easily, while light solids like bentonite clay do not centrifuge as well.

The decanter type of centrifuge was chosen for this dewatering application because it is very adaptable to a variable influent solids content typical of large reserve pits. Minor changes in influent are controlled through monitoring of pH and solids product of the centrifuge.

The centrate is fed to a thickener, which has a small tank with a series of mixers, baffles and specially designed bottoms. The mixers reduce effects of solids buildup. The conical designed bottoms in the tank promote optimum removal of solids.

The centrate feed enters the thickener in a small mix tank where coagulant and polymer are added separately to the waste stream. They are mixed thoroughly and allowed to overflow into a first section of the unit, the heavy solids compartment. The slurry at this point is dewatered, and the heavy solids settle rapidly. The lighter solids in the partially treated water flow into a second section of the thickener where they settle out. The water overflows the second compartment into a water surge tank where the water quality is typically less than 1 weight percent solids with few contaminants.

The solids in the underflow of the thickener are recycled to the mud feed line prior to the pH adjustment point. By adding these recycled solids early in the flow-line from the pit, benefits are obtained from a residual polymer and earlier pH adjustment. Additionally, sludge dewatering in the centrifuge and chemical consumption are optimized.

The final stage of the process is a mobile water treatment unit which receives influent with a maximum of 1.5 weight percent solids. Further pH adjustment is necessary to achieve coagulation and remove the remaining solids. A stream of bubbles is passed through the water below the introduction of the influent. This action produces large quantites of fine air bubbles as shown in U.S. Pat. No. 3,479,281. The bubbles and solid particles adhere to each other and are then mixed with an organic polymer. The polymer encapsulates the solids and air bubbles. When enough air bubbles are trapped with the flocculated particle, the particle floats to the surface. This flotation in a large quiescent tank provides three advantages, namely (a) any remaining heavy solid particles can attach themselves to these air bubbles and float, (b) the air bubbles form a support blanket under the solids to provide a stable floating slurry; and (c) the air blanket promotes continual dewatering of the slurry.

The floating solids may be removed from the basin with a chain driven skimmer. The skimmings are pumped to the thickener unit, where any residual chemical in the skimmings is reused in the initial treatment of the centrate. This eliminates possible residual chemicals in the discharge, utilizes these residual chemicals in the system and reduces chemical consumption in the entire process.

The solid mud cake product from the centrifuge is conveyed and stacked pending later disposal. This produced mud cake is normally 50–70 weight percent solids.

At this point my process greatly reduces almost all contaminants in the waste stream to within discharge requirements except for substances containing chlorides. The only chlorides removed are those trapped by the polymer or other solids. Although minor reduction in chlorides may be realized by previously described options in this process, further reduction to levels below 500 mg/l may be achieved with the additon of a dispersant in a reverse osmosis system. Either sulphuric or phosphoric acid must be added to the water to disperse compounds having low solubility which tend to plug the reverse osmosis system. This system produces very pure, but slightly acidic water with a brine by-product which may be reused in drilling operations, hauled to a salt water disposal well or discharged to saline waters.

The pH of the water with dissolved solids removed may be less than 6.0 and must be adjusted by addition of an inorganic base (sodium aluminate) to meet effluent limitations. Other effluent limitations are checked for compliance and may be recycled to a slurry surge tank for retreatment if necessary. The primary by-product of the pit reclamation process is clean water, which may be conserved for other use, irrigated or discharged directly to a water course.

The use of reverse osmosis to treat the aqueous fraction of drilling fluids is unique. Previously, high chloride waters had to be hauled away and injected into a disposal well or discharged under very controlled conditions to fresh water streams with environmental risk. This application of reverse osmosis considerably reduces the amount of salt water hauling, injecting, and discharging usually required. The fresh water by-product is normally of much higher quality than that of the receiving waters or local drinking water sources.

BRIEF DESCRIPTION OF THE DRAWINGS

FIG. 2 is a block flow diagram of a modified form of the process of the present invention.

FIG. 3 is a block flow diagram of the process of the present invention using a decanting centrifuge as a primary solids separator and a LAMELLA ® settler-thickener as a secondary solids separator.

FIG. 4 is a schematic of a modified form of the process of the present invention employing as a primary solids removal unit a positive vacuum thickener unit and a gravity settling tank unit.

FIG. 5 is a schematic of a modified form of the process of the present invention using as a heavy solids removal unit a gravity settling tank of the slant plate type.

BEST MODE FOR CARRYING OUT THE INVENTION

Figure 1:
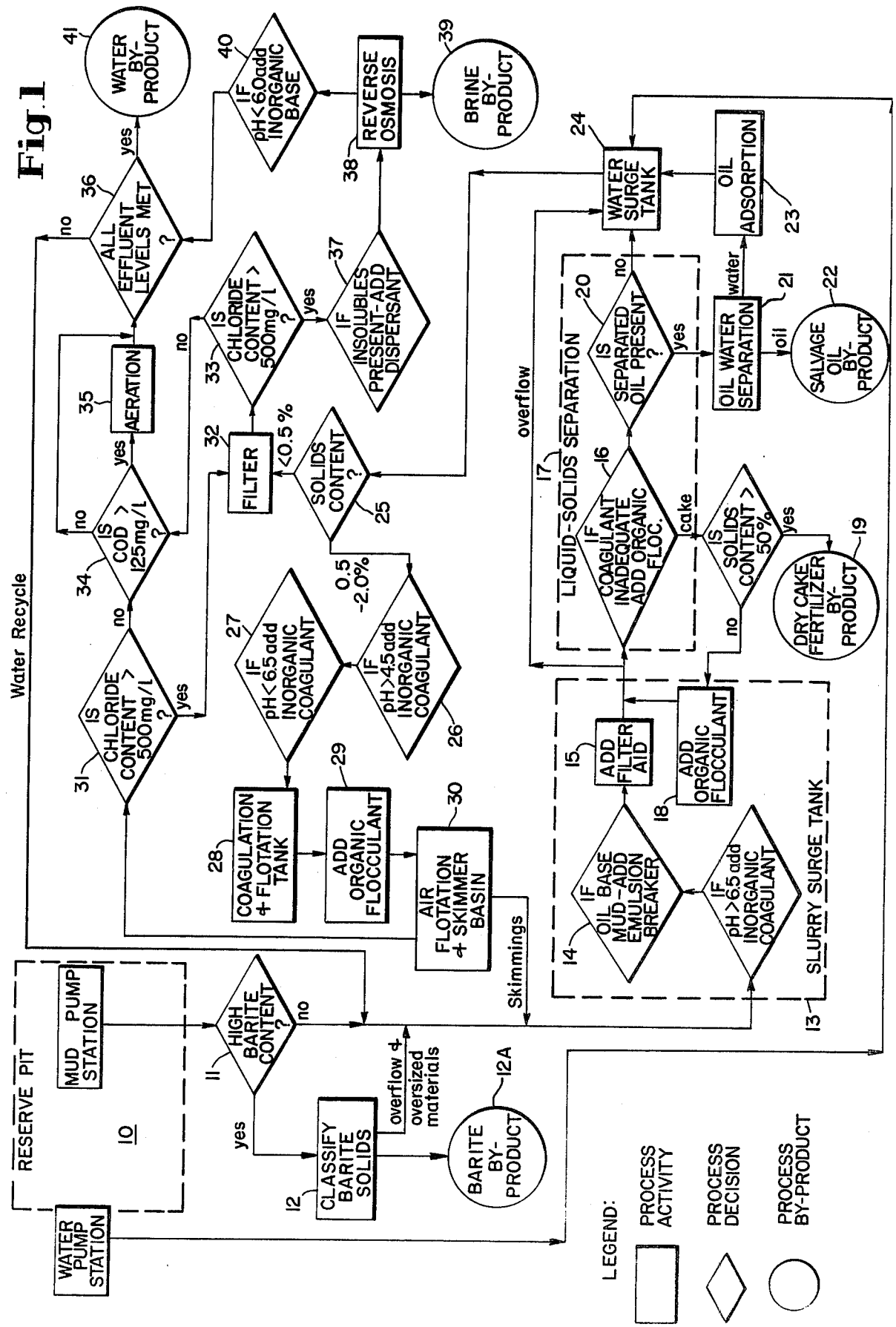
FIG. 1 is a schematic diagram of the entire process of the present invention for the treatment of waste drilling fluids in reserve pits.

Referring now to FIG. 1, the entire process is shown wherein influent to the process consists of a drilling mud slurry and some overlying water partially clarified by natural gravity settlement of solids. Both the mud slurry and water are normally contained in a reserve pit 10 at the drilling site and are pumped separately to the treatment system. A remotely controlled raft with submerged agitator and pump are used to transport the mud slurry from the pit. This process assures removal of thicker slurry from all portions of the pit that are not normally accessible by conventional pumping from the pit dikes as used in other drilling fluid treatment processes. Any overlying water layers are more conventionally pumped to the treatment system from the dike perimeter.

If the drilling fluids are heavily weighted with barite 11, this high specific gravity mineral may be removed if sufficient quantities of water are available at the drilling site. In the barite recovery unit 12, either a spiral separator or a hydrocyclone system may be used. For a hydrocyclone system, the slurry is diluted with water, mixed and mechanically thickened in a conical thickener tank.

The thinner overflow by-passes the barite recovery unit and goes directly to the slurry surge tank 13. The thicker underflow is again diluted with water, mixed and pumped to a hydrocyclone.

In the hydrocylcone, the thinner slurry overflows to the slurry surge tank 13, and the thicker underflow is again diluted with water, mixed and pumped to a second hydrocyclone. The thinner slurry overflow from the second hydrocyclone is recycled to the system immediately downstream of the conical thickener tank. 10 The thickened underflow is passed over a 200-mesh parabolic screen with additional water. The oversized materials are added to the slurry surge tank 13. The undersized materials from the screen are thickened in a second conical thickener tank.

Overflow, from the second thickener is added to the slurry surge tank 13. Underflow, which is predominately barite, is filtered and dried for other use at 12A.

The slurry is received at the slurry surge tank 13 from either the barite recovery unit 12 or the reserve pit 10. The pH of the normally alkaline drilling fluids is reduced to less than 6.5 by the addition of an inorganic, acidic coagulant (e.g. aluminum sulfate, phosphoric acid or nitric acid) in tank 13. If the drilling fluids are predominantly oil-based, an emulsion breaking agent may be added to aid oil separation at 14.

A filter aid may be added to the slurry surge tank 13 at 15 to improve drainage of the solids and/or to reduce the chemical oxygen demand of the liquids. Diatomaceous earth, activated bauxite, crushed coal and fine bagasses are typical filter aids used depending upon the particular drilling fluid application.

From the slurry surge tank 13, the slurry (underflow) is pumped to the primary liquid-solids separation unit where an organic flocculant (polyacrylamide) may be added to aid flocculation of the solids at 16. The liquid-solids separation apparatus 17 may be a decanting centrifuge, a belt filter press, a vacuum conveyor or a slant plate thickener. The separated solids (cake) should have a solids content of greater than 50 percent with proper conditioning. More flocculant may be added to the slurry surge tank at 18 to achieve the required solids content. The dry cake by-product 19 is environmentally compatible and may be spread as a fertilizer, buried or hauled to a landfill by conventional dump trucks, rather than by more expensive vacuum trucks which haul much less solid matter in slurry form.

This process is also an improvement over the prior art because the chemical additives used add nitrogen and phosphorus, the major constituents of fertilizer, to the cake. The cake is produced continuously by mechanical separation unlike other processes which rely on natural gravitational settlement of solids in the pit after chemical treatment. Prior art processes are limited in that chemical additives are determined on the basis of one or a few samples, and the fluids are batch treated accordingly. Reserve pits are more appropriately treated continuously since the fluid chemistry in the pit may vary spatially.

If an oil-base fluid is being treated as at 20, oil may be separated from the water either in the primary liquid-solids separation unit 17 if a three stage centrifuge is used, or in the oil-water separation unit 21. Here the oil may be recovered by a paddle wheel skimmer or by continuous oil absorbing mops. The salvage oil by-product 22 may be sold for further treatment and reuse.

From the oil-water separation unit 21 the waste water is pumped to an oil adsorption unit 23 which may consist of activated carbon or coal filter elements. Organic substances in solution are adsorbed onto disposable or regeneratable filter elements in this option. The waste water with reduced organic material and chemical oxygen demand then goes to a water surge tank 24.

Waste water having a solids content less than about two percent is received at the water surge tank 24 from the reserve pit 10, the overflow from the slurry surge tank 13, 14, 15, 18, the primary liquid solids separation unit 17, or the oil adsorption unit 23. The method of subsequent solids removal depends upon the solids content 25.

Generally, waters with a solids content of 0.5-2 weight percent are treated by an air flotation method or a slant plate thickener method shown in FIGS. 2 or 5. In the air flotation treatment option the pH of the water is reduced to 4.5 by the addition of an acidic inorganic coagulant, normally aluminum sulfate at 26. Because discharge regulations generally require pH to be in the range of 6.0-9.0, a basic inorganic coagulant (sodium aluminate) is added to increase the pH to 6.5 at 27.

The pH adjusted water is then sent to a coagulation and flotation tank 28 where small bubbles are introduced to begin floating the coagulated solids. A polyacrylamide flocculant is added at 29 to further bind the solid particles in the water which is sent to the air flotation and skimmer basin 30 as described by way of example in U.S. Pat. No. 3,479,281.

Small bubbles are again introduced in the air flotation and skimmer basin 30 to assure that residual solids are floated and skimmed from the water surface. The skimmings are returned to the slurry surge tank 13. Water is directed under baffles to avoid carry-over of floating solids.

If the chloride content of the water is greater than 500 mg/l 31, the water passes through a 1-5 micron filter 32 to remove very fine solids. If the solids content of water at the water surge tank 24 is less than 0.5 percent by weight at 25, the air flotation system 26-30 may be by-passed, and waste water can go directly to the filter 32. If the chloride content of the water is less than 500 mg/l 33, the chemical oxygen demand of the water is next addressed in the treatment process at 34.

If the chemical oxygen demand of the water remains greater than 125 mg/l after previous treatment, an aeration system 35 may be employed. The water is sprayed from nozzles which produce a fine mist, exposing much of the water volume to the air. The mist is collected and tested for compliance with effluent limitations at 36 prior to discharge. If previous treatment has adequately reduced the chemical oxygen demand, the water may by-pass the aeration system for testing at 36.

Although minor reduction in chlorides may be realized by previously described options in this process, further reduction to levels below 500 mg/l may be achieved with the addition of a dispersant 37 in a reverse osmosis system 38. Either sulphuric or phosphoric acid must be added to the water to disperse compounds having low solubility which tend to plug the reverse osmosis system. This system produces very pure, but slightly acidic water with a brine by-product 39 which may be reused in drilling operations, hauled to a salt water disposal well or discharged to saline waters.

The pH of the water with dissolved solids removed may be less than 6.0 and if so must be adjusted at 40 by addition of an inorganic base (sodium aluminate) to meet effluent limitations. Other effluent limitations are checked for compliance at 36 and may be recycled to the slurry surge tank 13 for retreatment if necessary. The primary by-product of the pit reclamation process is clean water 41, which may be conserved for other use, irrigated or discharged directly to a water course.

The use of reverse osmosis to treat the aqueous fraction of drilling fluids is unique. Previously, high chloride waters had to be hauled away and injected into a disposal well or discharged under very controlled conditions to fresh water streams with environmental risk. This application of reverse osmosis considerably reduces the amount of salt water hauling, injecting, and discharging usually required. The fresh water by-product is normally of much higher qualtiy than that of the receiving waters or local drinking water sources.

Referring now to FIG. 2, 100 designates a reserve pit or barge containing waste drilling fluid to be processed. The fluid, liquid and solid is pumped to a slurry surge tank 101, thence to a chemical conditioning station 102 where aluminum sulfate, sodium aluminate and a polymer as necessary is added to control pH and to optimize coagulation and flocculation. After chemical conditioning the fluid is pumped to the primary solids separation unit 103 which may be either a centrifuge, a thickener or filter of the positive vacuum type. The fluid is then pumped to the secondary solids separation unit 104 which may be a slant plate settler/thickener or a flotation unit described hereinabove. The solids from 104 may be recycled to 103 and concentrated in cake form removed at 105. The liquid from unit 104 then is pumped to the organic matter removal unit 106 where it is subjected to carbon adsorption or reverse osmosis membranes. The water may be pumped to the dissolved solids removal station 107 where reverse osmosis membranes will filter water meeting environmental discharge requirements.

Referring now to FIG. 3, 110 designates a source of drilling fluids which are pumped to a slurry surge tank 111, thence to a chemical conditioning station 112 where aluminum sulfate (sodium aluminate) or other organic coagulants are added followed by addition of a polymer flocculant to control pH thereby optimizing coagulation and flocculation of the fluids. The fluids are then sent to a decanting centrifuge 113 which separates the fluids into a relatively dry mud cake and partially clarified water. The water is then passed to a slant plate settler/thickener 114 of the type identified hereinabove as a LAMELLA®. The concentrated solids from the slant plate settler/thickener are returned to the centrifuge 113. Clean water overflow from the slant plate settler/thickener is dischargeable to the environment.

Referring now to FIG. 4, the reserve pit 50 contains both liquid and solid drilling fluid waste which is sent by pump 51 through a treatment line into which aluminum sulfate is introduced at 52, sodium aluminate at 53, and a polyacrylamide at 54. The quantities of each chemical is controlled by pH probes 55 and 56. The treated slurry then is passed to a solids separator in the form of a vacuum filter conveyor 57. The vacuum filter conveyor 57 produces a relatively dry mud cake at 58 which is sent to a hopper 59 for further concentration. Water from the vacuum filter conveyor is sent to a clean water reserve tank 60 for further use or discharge to the environment.

Referring now to FIG. 5, a modified form of my process is shown in which the liquid and solid waste is sent from reserve pit 70 by a pump 71 to a LAMELLA® type gravity separator thickener unit 72 through treatment line 73 into which aluminum sulfate is introduced at 74, sodium aluminate at 75 and a polyacrylamide at 76. The quantities of each chemical introduced is monitored by pH probes 77 and 78. The solids removed from the LAMELLA® 72 are returned through line 80 to the reserve pit 70 and the clarified water passed to tank 81 for either discharge or recycling.

Figure 6:
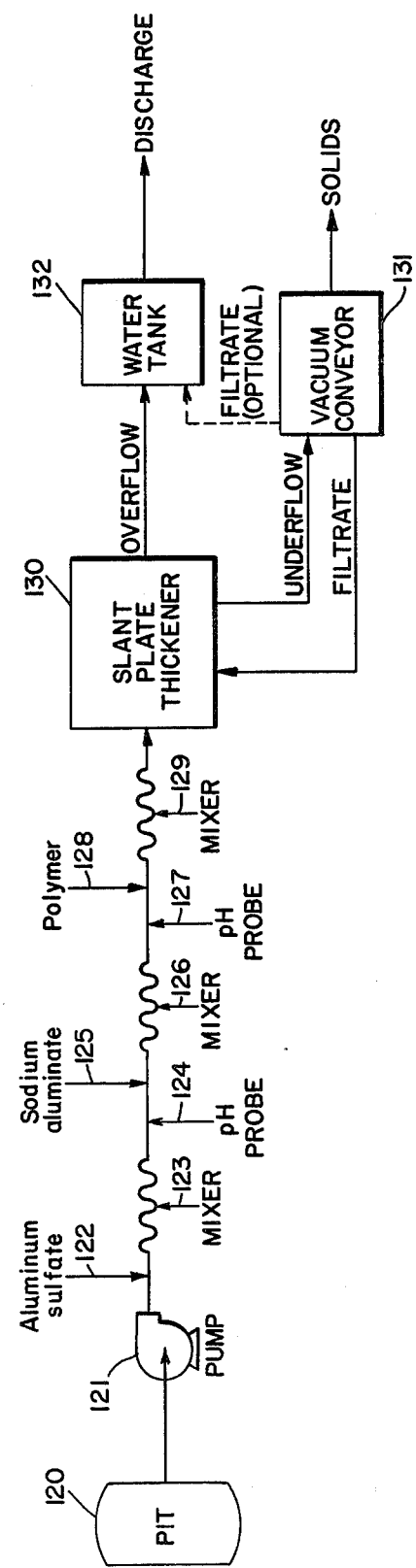
FIG. 6 is a schematic of a further modified form of the process of the present invention using a slant plate thickener and a vacuum conveyor.

Referring now to FIG. 6, solid waste is pumped from reserve pit 120 by a pump 121 after which a chemical conditioning with aluminum sulfate sodium aluminate and a polymer flocculant are added at 122, 125 and 128. Mixing of the admixture of the waste drilling fluids and chemicals occurs with mixers at 123, 126 and 129.

The pH is controlled through monitoring probes located at 124 and 127. The conditioned waste drilling fluids enter the slant plate thickener at 130 from which the thickened underflow is pumped to a vacuum conveyor at 131. Filtrate from the vacuum conveyor may be directed to a water tank at 132 or depending upon water quality may be returned to the slant plate thickener at 130. Overflow from slant plate thickener is directed to water tank at 132 which contains water of sufficiently good quality for discharge to the environment. Solids from the vacuum conveyor at 131 may be returned to the environment or employed for other uses.

What I claim is:

1. The method of rendering a waste drilling fluid slurry from oil wells containing cuttings, formation fluid solids and liquids and the like, safe for environmental discharge both in a liquid and solid cake state comprising the steps of
    (a) conducting the uphole drilling fluids to a continuous flow process having a slurry surge tank for chemical conditioning by addition of an inorganic acidic coagulant permitting settling and thickening,
    (b) subjecting the thickened mud slurry under flow from step (a) thereafter to a primary solids separation unit where an organic flocculant of the group of polyacrylamides is added to aid flocculation of the solids and from which solids of less than 50% moisture content and water are produced,
    (c) subjecting the water from (b) to a secondary solids removal unit, chemically conditioning and reintroducing the solids recovered back to the primary solids separation unit,
    (d) subjecting the water obtained from the secondary solids removal step (a) to a chemical oxygen demand reduction unit having a carbon adsorption unit for removal of organic substances or a reverse osmosis unit for removal of organic substances and dissolved solids including chlorine compounds to meet environmental discharge requirements,
    (e) removing the treated primary solids from step (b) consisting of an environmentally compatible cake meeting environmental leachate requirements for disposal as landfill on or off the drill site.

2. The process of claim 1, wherein the primary solids separation unit of step (c) is a decanting centrifuge.

3. The process of claim 1, wherein the primary solids separation unit of step (c) is a positive vacuum filtration thickener unit.

4. The process of claim 1, wherein the secondary solids separation unit of step (d) conducts a liquid suspension through separate parallel settling spaces defined by inclined surfaces wherein the clarified liquid flows upward of the surfaces, and the solids sink down the inclined surfaces.

5. The process of claim 1, wherein the secondary solids separation unit of step (d) is a flotation unit wherein the solids are floated to the surface on extremely small bubbles and skimmed from the surface.

6. The process of claim 1 wherein the pH of the normally alkaline drilling fluids is reduced to less than 4.5 by the addition of an inorganic acidic coagulant of the group of aluminum sulfate, phosphoric acid or nitric acid, the quantity of coagulant being dependant upon monitoring the pH.

7. The process of claim 1 wherein the chemical conditioning consists of reducing pH of fluids to 4.5 with use of an inorganic acid coagulant and raising the pH to 6.5 with use of an inorganic basic coagulant of aluminum sulfate and an organic polyacrylamide flocculant.

8. The process of claim 1, wherein the organic flocculant is a polyacrylamide introduced after the chemical conditioning by addition of an acidic inorganic coagulant of aluminum sulfate in steps 1(a) and 1(d) and a basic inorganic coagulant of sodium aluminate in step 1(d) to the drilling fluids the proportions of each coagulant being that amount necessary to reduce the fluids to a pH of 4.5 and then to raise the pH to 6.5 respectively for environmental discharge.

9. The process of claim 9 wherein an acidic inorganic coagulant aluminum sulfate is added in an amount necessary to reduce the water with solids content to a pH of 4.5.

10. The process of claim 8 wherein the pH is raised to a range of 6.0 to 9.0 by addition of a quantity of sodium aluminate.

* * * * *